US011863231B2

(12) United States Patent
Chen

(10) Patent No.: US 11,863,231 B2
(45) Date of Patent: Jan. 2, 2024

(54) OPTICAL NETWORK OPTIMIZER AND OPTICAL NETWORK OPTIMIZATION METHOD THEREOF

(71) Applicant: Wistron Corporation, New Taipei (TW)

(72) Inventor: Chih-Ming Chen, New Taipei (TW)

(73) Assignee: Wistron Corporation, New Taipei (TW)

( * ) Notice: Subject to any disclaimer, the term of this patent is extended or adjusted under 35 U.S.C. 154(b) by 429 days.

(21) Appl. No.: 17/229,828

(22) Filed: Apr. 13, 2021

(65) Prior Publication Data

US 2022/0263572 A1     Aug. 18, 2022

(30) Foreign Application Priority Data

Feb. 17, 2021   (TW) .................................. 110105203

(51) Int. Cl.
H04B 10/079     (2013.01)
G06N 3/04       (2023.01)
G06N 3/082      (2023.01)

(52) U.S. Cl.
CPC ........... H04B 10/0795 (2013.01); G06N 3/04 (2013.01); G06N 3/082 (2013.01); H04B 10/0793 (2013.01)

(58) Field of Classification Search
CPC .. H04B 10/0793; H04B 10/0795; G06N 3/04; G06N 3/082; G06N 3/044
See application file for complete search history.

(56) References Cited

U.S. PATENT DOCUMENTS

| | | | | |
|---|---|---|---|---|
| 2007/0256937 A1* | 11/2007 | Basker | ................. | C25D 11/024 205/157 |
| 2015/0195136 A1* | 7/2015 | Mermoud | ............... | H04L 41/12 706/12 |
| 2015/0333864 A1* | 11/2015 | Swinkels | ........... | H04B 10/0795 398/79 |
| 2017/0351293 A1* | 12/2017 | Carolan | .................. | G02F 3/024 |
| 2018/0205454 A1* | 7/2018 | Shiner | ..................... | H04L 43/20 |
| 2018/0359029 A1* | 12/2018 | Shiner | ................ | H04B 10/0793 |
| 2019/0266480 A1* | 8/2019 | Zhang | .................... | H04B 10/27 |
| 2019/0393965 A1* | 12/2019 | Zhang | ................. | H04L 27/2096 |

(Continued)

FOREIGN PATENT DOCUMENTS

CN     106447103 A     2/2017

OTHER PUBLICATIONS

Takahito Tanimura, "Deep Neural Network based Optical Monitor Providing Self-Confidence as Auxiliary Output," Nov. 15, 2018, 2018 European Conference on Optical Communication (ECOC), pp. 1-3.*

(Continued)

Primary Examiner — Omar S Ismail
(74) Attorney, Agent, or Firm — Winston Hsu

(57) ABSTRACT

An optical network optimization method is disclosed. The optimization method includes training a neural network, adjusting at least one of a plurality of auxiliary output values of a plurality of auxiliary neurons of the neural network, and performing inference with the neural network. A neural network and an attention mechanism are utilized to predict network performance key performance indicator(s) so as to achieve efficient routing optimization, network planning and fast failure recovery.

13 Claims, 5 Drawing Sheets

(56) References Cited

U.S. PATENT DOCUMENTS

| | | | |
|---|---|---|---|
| 2021/0097378 A1* | 4/2021 | Rodrigues | G06N 3/067 |
| 2021/0142170 A1* | 5/2021 | Ozcan | G06N 3/04 |
| 2021/0201126 A1* | 7/2021 | Meng | G02F 3/00 |
| 2021/0390449 A1* | 12/2021 | Chu | G06N 3/084 |
| 2022/0004851 A1* | 1/2022 | Bohnstingl | G06N 3/065 |
| 2022/0122313 A1* | 4/2022 | Ozcan | G06V 10/82 |
| 2022/0247551 A1* | 8/2022 | Joye | H04L 9/008 |
| 2022/0383111 A1* | 12/2022 | Baker | G06N 3/045 |

OTHER PUBLICATIONS

Yunfeng Lu, "Flexible and Scalable Optical Interconnects for Data Centers: Trends and Challenges," Oct. 17, 2019, IEEE Communications Magazine, vol. 57, Issue 10, Oct. 2019, pp. 27-31.*
H. John Caulfield, "Optical Neural Network," Oct. 1989, Proceedings of the IEEE, vol. 77, Issue: 10, pp. 1573-1580.*
Sasikumar A, "Reconfigurable and hardware efficient adaptive quantization model-based accelerator for binarized neural network," Aug. 8, 2022, Computers and Electrical Engineering 102 (2022), pp. 1-5.*
Thorbjörn Posewskya, "Throughput optimizations for FPGA-based deep neural network inference," Apr. 25, 2018, Microprocessors and Microsystems 60 (2018), pp. 152-158.*
Takahito Tanimura et al., Deep Neural Network based Optical Monitor Providing Self-Confidence as Auxiliary Output, Sep. 23, 2018, pp. 1-3, XP033447517, IEEE.

* cited by examiner

OPTICAL NETWORK OPTIMIZER AND OPTICAL NETWORK OPTIMIZATION METHOD THEREOF

BACKGROUND OF THE INVENTION

1. Field of the Invention

The present invention relates to an optical network optimizer and an optical network optimization method thereof, and more particularly, to an optical network optimizer and an optical network optimization method thereof able to realize routing optimization, network planning, and rapid failure recovery.

2. Description of the Prior Art

Software-Defined Networks offer an unprecedented degree of flexibility in network control and management that, combined with timely network measurements collected from the data plane, open the possibility to achieve efficient online network optimization. However, existing network modeling techniques based on analytic models (for instance, Queuing theory) cannot handle this huge complexity. As a result, current optimization approaches are limited to improve a global performance metric, such as network utilization or planning the network based on the worst case estimates of the latencies obtained from network calculus. Therefore, there is still room for improvement when it comes to network optimization.

SUMMARY OF THE INVENTION

It is therefore a primary objective of the present invention to provide an optical network optimizer and an optical network optimization method thereof to realize routing optimization, network planning, and rapid failure recovery.

An embodiment of the present invention discloses an optical network optimization method. The optical network optimization method includes training a neural network; adjusting at least one of a plurality of auxiliary output values of a plurality of auxiliary neurons of the neural network; and performing inference with the neural network.

Another embodiment of the present invention discloses an optical network optimizer. The optical network optimizer includes a storage circuit and a processing circuit, coupled to the storage device, configured to execute the instructions stored in the storage circuit. The storage circuit is configured to store instructions of: training a neural network; adjusting at least one of a plurality of auxiliary output values of a plurality of auxiliary neurons of the neural network; and performing inference with the neural network.

These and other objectives of the present invention will no doubt become obvious to those of ordinary skill in the art after reading the following detailed description of the preferred embodiment that is illustrated in the various figures and drawings.

DETAILED DESCRIPTION

Use of ordinal terms such as "first" and "second" does not by itself connote any priority, precedence, or order of one element over another or the chronological sequence in which acts of a method are performed, but are used merely as labels to distinguish one element having a certain name from another element having the same name. Different technical features described in the following embodiments may be mixed or combined in various ways if they are not conflict to each other.

In order to achieve routing optimization, network planning, and rapid failure recovery, the present invention produce accurate estimates for network performance key performance indicator(s) (KPI) by means of neural network(s) and attentional mechanism(s).

Figure 1:
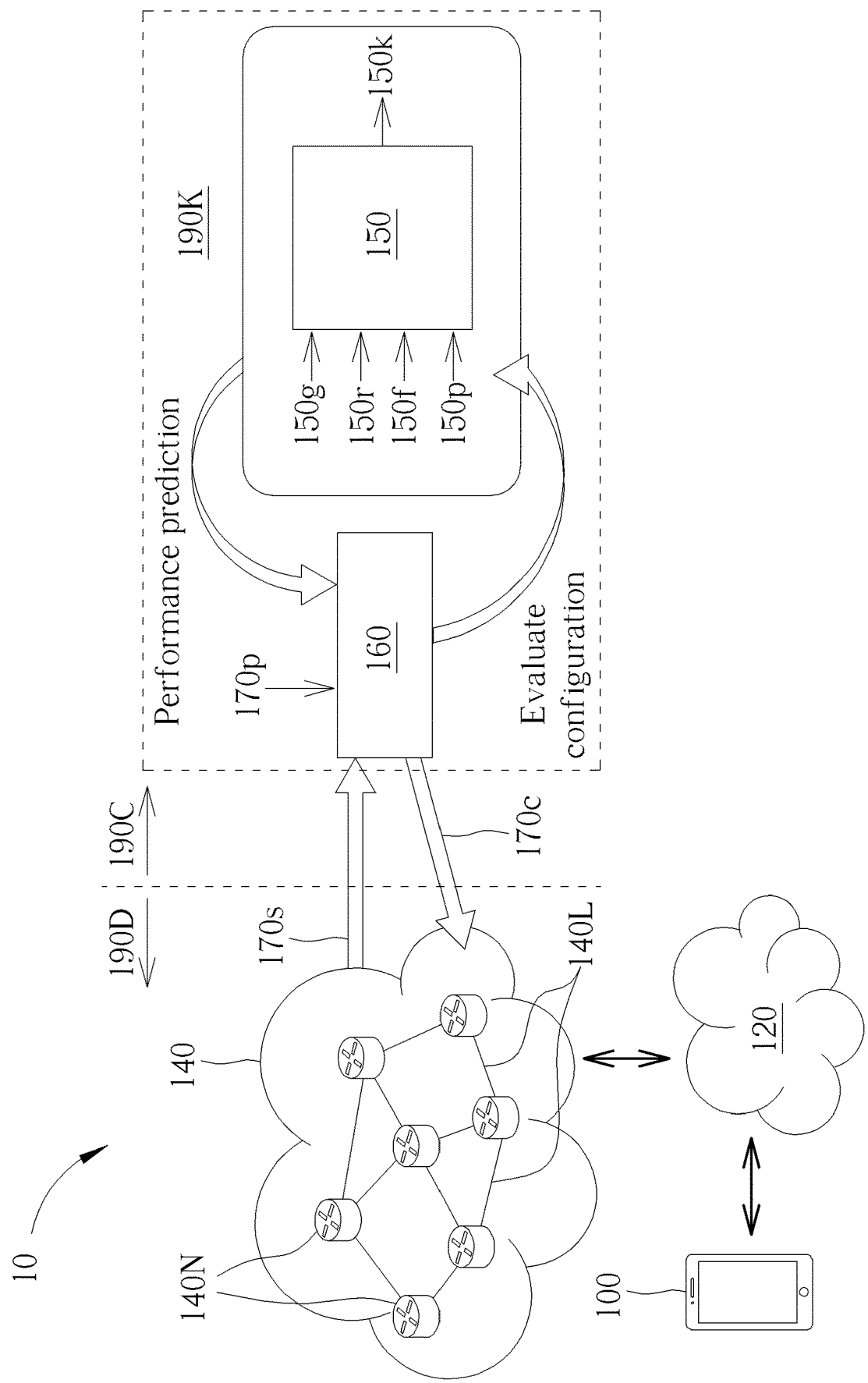
FIG. 1 is a schematic diagram of a system according to an embodiment of the present invention.

Please refer to FIG. 1. FIG. 1 is a schematic diagram of a system 10 according to an embodiment of the present invention. The system 10 may include a user equipment (UE) 100, a radio access network (RAN) 120, a mesh network 140 and an optimizer 160. The radio access network 120 is configured to provide a communication connection between the UE 100 and the mesh network 140. The mesh network 140 may belong to a data plane 190D. The mesh network 140 may be an optical mesh network, and may include multiple nodes 140N and links 140L. One link 140L is connected between two nodes 140N; multiple links 140L may form a path. One node 140N may include a transponder, a multiplexer (MUX), an amplifier (AMP), a reconfigurable optical add/drop multiplexer (ROADM), demultiplexer (DEMUX), or other optical device(s). In the knowledge plane 190K, there is the optimizer 160. The optimizer 160 may collect network state(s) 170s from the data plane 190D, and may obtain timely statistics such as traffic volume (for instance, a traffic matrix 150f). The network state 170s may include (average) packet loss, (average) jitter, or (average) delay/latency of each path. The traffic matrix 150f may be defined as the bandwidth between two nodes 140N in the mesh network 140. The optimizer 160 may leverage the estimate of network performance key performance indicator (s) 150k made by a network model 150 to realize routing optimization, network planning (for instance, to select the optimal link configuration/placement), and rapid failure recovery.

Specifically, the network model 150 may analyze the relationship between topology 150g, routing 150r, the traffic matrix 150f corresponding to the input traffic and a power matrix 150P. Besides, the network model 150 may be tasked to accurately predict/estimate the network performance key performance indicator (s) 150k (for instance, delay, jitter, or packet loss) for a specific configuration 170c. The power matrix 150p may be defined as the optical powers corresponding to multiple links 140L of the mesh network 140. By adjusting the optical power of the optical device(s) of the node 140N of the mesh network 140, the embodiment(s) of the present invention may optimize the network performance key performance indicator (s) 150k. It is worth noting that the network model 150 may take the topology 150g, the scheme of the route 150r from the source to the destination (such as the list of end-to-end paths), the traffic matrix 150f and the power matrix 150p as inputs, but they may be used as outputs (for example, based on the current network state 170s) alternatively.

In an embodiment, the network model 150 may leverage the ability of graph neural network(s) (GNN) and attention mechanism(s) to study/learn and model graph-structured information; therefore, the network model 150 is able to generalize over arbitrary topologies, routing schemes, traffic matrix corresponding to traffic intensity, and power matrix. Furthermore, the network model 150 is able to produce accurate estimates/predictions even in topologies, routing traffic matrices, and power matrices unseen in the training (for instance, the step S402 of an optimization method 40).

For example, the internal architecture of the network model 150 may refer to the algorithm shown in Table 1. The network model 150 may run the algorithm shown in Table 1 (for instance, hill-climbing) to repeatedly iteratively explore the performance of different/candidate configurations 170c until the network model 150 finds one configuration mode 170c meeting a target policy 170p. The target policy 170p may include a plurality of optimization objectives and constraints. The optimization objectives may be, for example, to minimize end-end delay/latency. The constraints may be, for example, security policy.

TABLE 1

| | Input: $x_p$, $x_1$, R<br>Output: $h_p^T$, $h_1^T$, $y_p$ |
|---|---|
| 1 | foreach p∈R do $h_p^0 \leftarrow [x_p, 0..., 0]$; |
| 2 | foreach l∈N do $h_1^0 \leftarrow [x_1, 0..., 0]$; |
| 3 | for t=0 to T-1 do |
| 4 |   foreach p∈R do |
| 5 |     foreach l∈p do |
| 6 |       $h_p^t \leftarrow RNN_t(h_p^t, h_1^t)$ |
| 7 |       $m_{p,l}^{t+1} \leftarrow h_p^t$ |
| 8 |     end |
| 9 |     $h_p^{t+1} \leftarrow h_p^t$ |
| 10 |   end |
| 11 |   foreach l∈N do |
| 12 |     $h_1^{t+1} \leftarrow U_t(h_1^t, \Sigma_{p:k \in p} m_{p,k}^{t+1})$ |
| 13 |   end |
| 14 | end |
| 15 | $y_p \leftarrow F_p(h_p)$ |

As shown in Table 1, the network model 150 may receive the initial link attribute/function/feature $x_1$, the initial path attribute/function/feature $x_p$, and the routing description R as inputs, and output the inferred feature metrics $y_p$. The initial link attribute/function/feature $x_1$ may be related to the optical power.

In the algorithm shown in Table 1, the loop from line 3 to line 14 may represent message-passing operations. In the message-passing operations, the information encoded (for instance, hidden states) among links and paths may be exchanged mutually. The network model 150 may repeat the message passing operations over the link hidden state vector $h_1$ of the link and the path hidden state vector $h_p$ of the path T times (for instance, loop from line 3 in the algorithm shown in Table 1), which make the initial link hidden state vector $h_1^0$ of initial link and the path hidden state vector $h_p^0$ converge.

In the algorithm shown in Table 1, by directly mapping the routing description R (namely, the set of end-to-end paths) to the message passing operations among link and path, each path collects messages from all the links included in it (for instance, loop from line 5) and each link receives messages from all the paths including it (for instance, line 12). The recurrent function $RNN_t$ in line 6 may correspond to recurrent neural network (RNN), which may be well suited to capture dependence in sequences of variable size and thus may be utilized to model according to the sequential dependence of links included in the path(s). In an embodiment, the neural network layer corresponding to the recurrent function $RNN_t$ may include a gated recurrent unit (GRU).

In the algorithm shown in Table 1, lines 9 and 12 may represent update functions/operations, which encode the new collected information into the hidden states respectively for paths and links. The update function $U_t$ in line 12 may correspond to a trainable neural network. In an embodiment, the neural network layer corresponding to the update function $U_t$ may include a gated recurrent unit.

In the algorithm shown in Table 1, the readout function $F_p$ in line 15 may predict the path-level feature metrics $y_p$ (for instance, delay/latency or packet loss) using the path hidden state vector $h_p$ as input. Alternatively, the readout function $F_p$ may infer link-level feature metrics $y_l$ using the path hidden state vector $h_p$ as input.

In an embodiment, the optimizer 160 may support optical power management. The optimizer 160 may execute the algorithm (for instance, the algorithm shown in Table 1) according to the target policy 170p so as to decide/find out the power matrix 150p with the best/optimal network performance key performance indicator(s). Furthermore, the optimizer 160 may collect the network state 170s of the mesh network 140. When the optimizer 160 determines/finds out that the optical attenuation of the link 140L included in a certain path of the mesh network 140 increases according to the network state 170s, the optimizer 160 may decide/find out the best/optimal power matrix 150p and provide the configurations 170c at a predetermined time to adjust the mesh network 140.

In an embodiment, the optimizer 160 may support recovery. The optimizer 160 may execute the algorithm (for instance, the algorithm shown in Table 1) according to the target policy 170p so as to decide/find out the path from the source to the destination with the best/optimal network performance key performance indicator(s). Furthermore, the optimizer 160 may collect the network state 170s of the mesh network 140. When the optimizer 160 determines/finds out a malfunction/breakdown/fault of the link 140L or node 140N included in a certain path of the mesh network 140 according to the network state 170s, the optimizer 160 may modify/adjust the topology 150g so as to decide/find out the best/optimal path from the source to the destination and provide the configurations 170c to adjust the mesh network 140.

In an embodiment, the optimizer 160 may support bandwidth calendaring. The optimizer 160 may execute the algorithm (for instance, the algorithm shown in Table 1) according to the target policy 170p so as to decide/find out the traffic matrix 150f with the best/optimal network performance key performance indicator(s). Furthermore, when it is expected/scheduled/planned to change/adjust the bandwidth of the path or the link 140L of mesh network 140, the optimizer 160 may decide/find out the best/optimal power matrix 150p and provide the configurations 170c at a predetermined time to adjust the mesh network 140.

Figure 2:
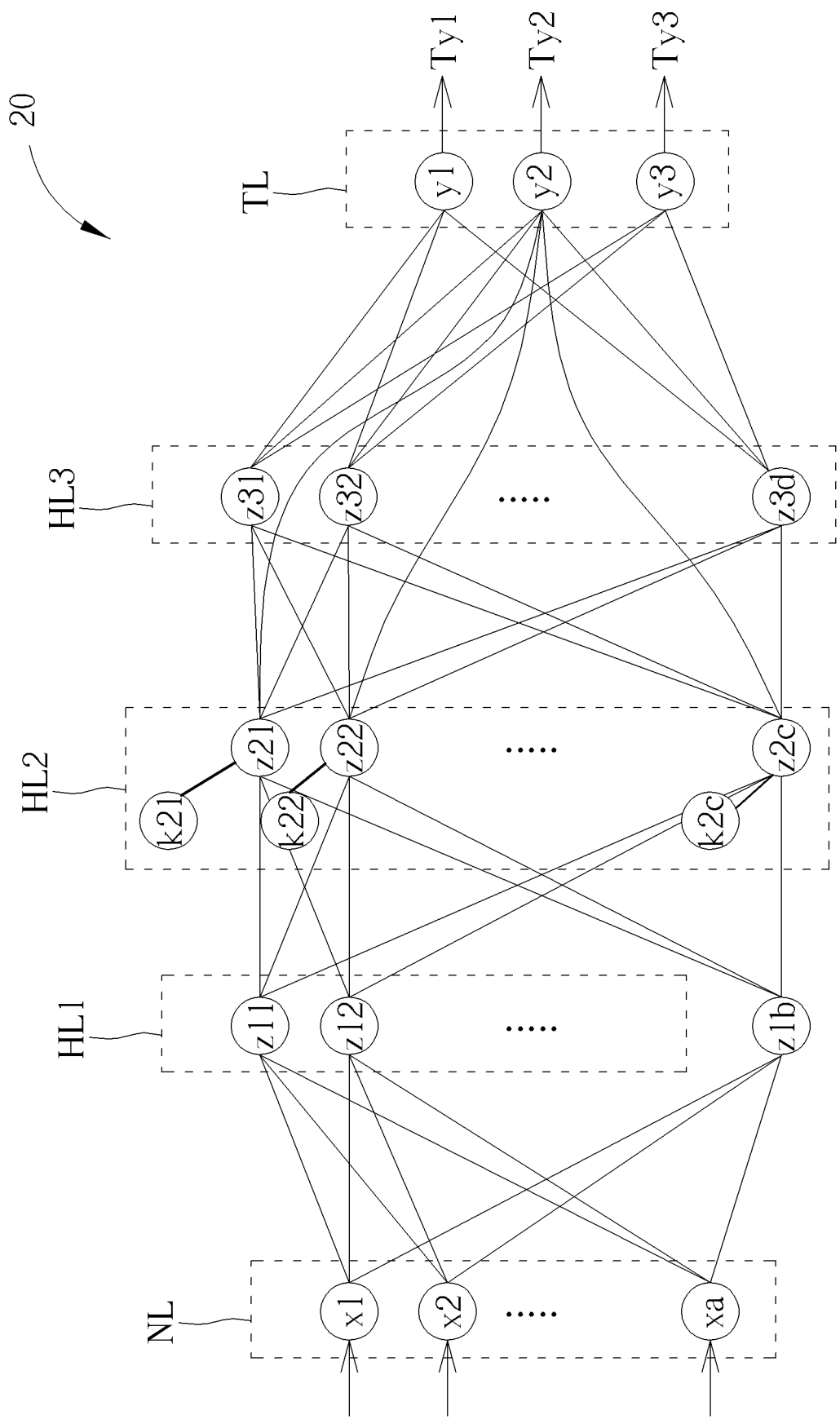
FIG. 2 and FIG. 3 are schematic diagrams of a neural network according to an embodiment of the present invention respectively.

FIG. 2 is a schematic diagram of a neural network 20 according to an embodiment of the present invention. The neural network 20 may correspond to the readout function $F_p$ shown in Table 1.

The neural network 20 may be a fully-connected neural network. The neural network 20 may include an input layer NL, hidden layers HL1, HL2, HL3, and an output layer TL. The input layer NL may include neurons x1, x2, . . . , and xa. The hidden layer HL1 may include neurons z11, z12, . . . , and z1b. The hidden layer HL2 may include neurons z21, z22, . . . , and z2c. The hidden layer HL3 may include neurons z31, z32, . . . , and z3d. Here, a, b, c, and d are positive integers. The output layer TL may include neurons y1, y2, and y3, but is not limited thereto. The output layer TL may include more or less numbers of neurons.

In an embodiment, the input values of the neurons x1 to xa (also referred to as the input neurons x1 to xa) of the input layer NL of the neural network 20 are related to the optical power.

In order to achieve routing optimization, network planning, and rapid failure recovery, the present invention produces accurate estimates for network performance key performance indicator (s) (KPI) by means of neural network (s) and attentional mechanism(s).

In an embodiment, the present invention may leverage the attention mechanism (s) to construct/develop/build/configure the neural network 20. For example, the neurons z21 to z2c of the hidden layer HL2 may be respectively connected to the neuron y2, and respectively correspond to hyper-parameters p21y2, p22y2, . . . , and p2cy2. In other words, the degree(s) of constraint/restriction/enhancement/strengthening of the feature(s) of the hidden layer HL2 may be determined/decided using the hyper-parameters p21y2 to p2cy2.

For example, an output value Ty2 of the neuron y2 may satisfy Ty2=g(W31y2*Tz31+W32y2*Tz32+ . . . W3dy2*Tz3d+p21y2*Tz21+p22y2*Tz22+ . . . +p2cy2*Tz2c). That is to say, the output value Ty2 of the neuron y2 may be equal to the sum of the output value(s) of the neuron(s) in the previous layer multiplied by its/their corresponding parameter(s) (for instance, the output value Tz31 of the neuron z31 multiplied by the parameter W31y2 from the neuron z31 to the neuron y2, the output value Tz32 of the neuron z32 multiplied by the parameter W32y2 from the neuron z32 to the neuron y2, . . . , and the output value Tz3d of the neuron z3d multiplied by the parameter W3dy2 from the neuron z3d to the neuron y2), the output value(s) of the neuron(s) in a certain layer multiplied by its/their corresponding hyper-parameter(s) (for instance, the output value Tz21 of the neuron z21 multiplied by the hyper-parameter p21y2 from the neuron z21 to the neuron y2, the output value Tz22 of the neuron z22 multiplied by the hyper-parameter p22y2 from the neuron z22 to the neuron y2, . . . , and the output value Tz2c of the neuron z2c multiplied by the hyper-parameter p2cy2 from the neuron z2c to the neuron y2), and/or bias, which is then transformed by the activation function g( ). In this case, the output values Tz21 to Tz2c of the neurons z21 to z2c may serve as distance functions respectively.

In an embodiment, the present invention may leverage the attention mechanism(s) to construct/develop/build/configure the hidden layer HL2. For example, the hidden layer HL2 may include neurons k21, k22, . . . , and k2c, which are respectively connected to the neurons z21 to z2c, and respectively correspond to hyper-parameters p21, p22, . . . , and p2c. In other words, the degree(s) to which the neurons k21 to k2c constrain/restrict/enhance/strengthen the feature(s) of the hidden layer HL2 may be determined/decided using the hyper-parameters p21 to p2c.

For example, the output value Tz21 of the neuron z21 may satisfy Tz21=g(W1121*Tz11+W1221*Tz12+ . . . +W1b21*Tz1b+p21*Tk21). That is to say, the output value Tz21 of the neuron z21 may be equal to the sum of the output value(s) of the neuron(s) in the previous layer multiplied by its/their corresponding parameter(s) (for instance, the output value Tz11 of the neuron z11 multiplied by the parameter W1121 from the neuron z11 to the neuron z21, the output value Tz12 of the neuron z12 multiplied by the parameter W1221 from the neuron z12 to the neuron z21, . . . , and the output value Tz1b of the neuron z1b multiplied by the parameter W1b21 from the neuron z1b to the neuron z21), bias, and/or the output value Tk21 of the neuron k21 multiplied by the hyper-parameter p21 from the neuron k21 to the neuron z21, which is then transformed by the activation function g( ) In this case, the output value Tk21 of the neuron k21 may serve as a distance function.

Accordingly, a neuron (for instance, the neuron z21) in the enhanced/strengthened neural network layer (for instance, the hidden layer HL2) in neural network 20 is directly connected to a neuron (also referred to as an output neuron) (for instance, the neuron y2) in the output layer TL and/or another neuron (also referred to as an auxiliary neuron) (for instance, the neuron k21). There is a hyper-parameter (for instance, the hyper-parameter p21) between the auxiliary neuron and the neuron. There is another hyper-parameter (for instance, the hyper-parameter p21y2) between the neuron and the output neuron. That is, the neural network 20 may use two-times attention mechanism(s) to enhance/strengthen the influence of the feature (s) of a certain neural network layer (for instance, the hidden layer HL2), which helps the neural network 20 to extract features, thereby improving the accuracy of inference.

The values of the hyper-parameters p21 to p2c and p21y2 to p2cy2 may be determined/decided according to different requirements. In an embodiment, the hyper-parameters p21 to p2c and p21y2 to p2cy2 may be real numbers greater than or equal to zero. When the hyper-parameters p21 to p2c and p21y2 to p2cy2 are large, hard constraint(s) is/are posed. When the hyper-parameters p21 to p2c and p21y2 to p2cy2 are small, soft constraint(s) is/are posed. In an embodiment, by adjusting/modifying the hyper-parameters p21 to p2c and p21y2 to p2cy2, the degree of the influence of a certain neural network layer (for instance, the hidden layer HL2) or a certain neuron (for instance, the neuron k21) on the neuron(s) (for instance, the neuron y2) of the output layer TL or whether the neural network layer (for instance, the hidden layer HL2) or the neuron influences the neuron(s) (for instance, the neuron y2) of the output layer TL may be determined according to, for example, the open system interconnection model (OSI) with the seven-layer structure.

In an embodiment, the output values Tk21 to Tk2c of the neurons k21 to k2c may serve as distance functions respectively. In an embodiment, the output values Tk21 to Tk2c of the neurons k21 to k2c may be real numbers in a range of 0 to 1. In an embodiment, the output values Tk21 to Tk2c of the neurons k21 to k2c may be converted from logic "0" or logic "1" into a differentiable form. In an embodiment, by adjusting/modifying the output values Tk21 to Tk2c of the neurons k21 to k2c, the degree of the influence of a certain neural network layer (for instance, the hidden layer HL2) or a certain neuron (for instance, the neuron k21) on the neuron(s) (for instance, the neuron y2) of the output layer TL may be regulated/adjusted/changed according to, for example, the seven-layer structure of the open system interconnection model.

It may be seen that the hidden layers of the neural network may respectively correspond to different layers of the open system interconnection model with the seven-layer structure.

Figure 3:
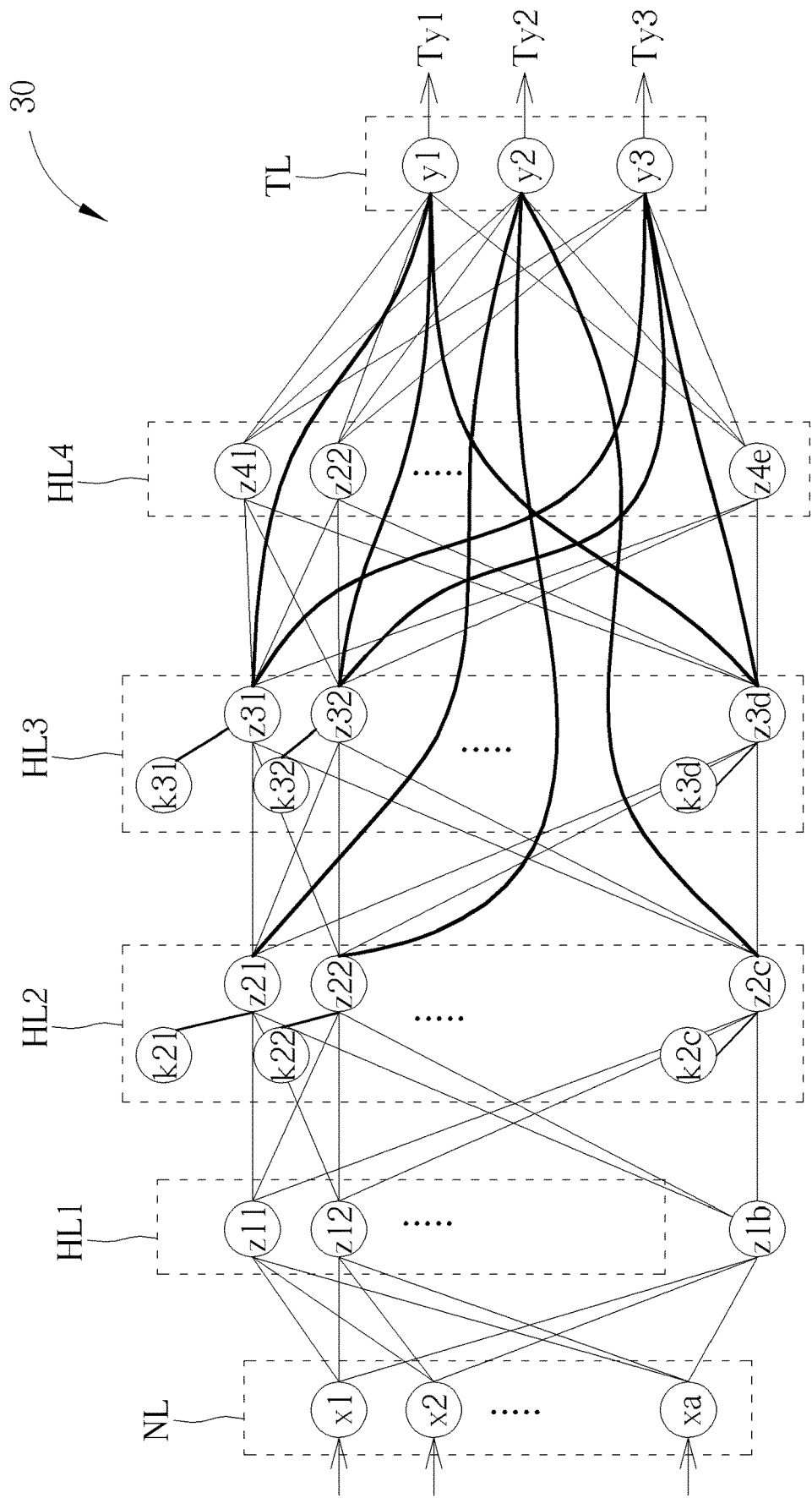

FIG. 3 is a schematic diagram of a neural network 30 according to an embodiment of the present invention. The structure of the neural network 30 shown in FIG. 3 is similar to that of the neural network 20 shown in FIG. 2 (to replace the neural network 20 with the neural network 30), and hence the same numerals and notations denote the same components in the following description. The neural network 30 may include the hidden layers HL1, HL2, HL3, and a hidden layer HL4, which may respectively correspond to the physical layer, the data link layer, the network layer, and the transport layer of the open system interconnection model with the seven-layer structure.

In an embodiment, the output value Ty1 of the neuron y1 may be related to (or equal to) or correspond to the delay/latency of the network performance key performance indicator(s). That is, the output value Ty1 of the neuron y1 may be a function of the delay/latency. Delay/latency may refer to the time it takes for a data packet to go from one place to another. The time that the data packet takes to get from the source to the destination is called end-to-end delay/latency. In an embodiment, delay/latency is mainly caused by the network layer, so the attention mechanism(s) may be introduced for the hidden layer HL3.

For example, the neurons $z31$ to $z3d$ of the hidden layer HL3 may be respectively connected to the neuron y1, and respectively correspond to hyper-parameters $p31y1$, $p32y1$, ..., and $p3dy1$. In other words, the degree(s) of constraint/restriction/enhancement/strengthening of the feature(s) of the hidden layer HL3 may be determined/decided using the hyper-parameters $p31y1$ to $p3dy1$. As shown in FIG. 3, the hidden layer HL4 may include neurons $z41$, $z42$, ..., and $z4e$, where e is a positive integer. Therefore, similar to the output value Ty2 of the neuron y2, the output value Ty1 of the neuron y1 may satisfy Ty1=g($W41y1*Tz41+W42y1*Tz42+$ ... $W4ey1*Tz4e+p31y1*Tz31+p32y1*Tz32+$ ... $+p3dy1*Tz3d$). In this case, the output values $Tz31$ to $Tz3d$ of the neurons $z31$ to $z3d$ may serve as distance functions respectively.

For example, the hidden layer HL3 may include neurons $k31$, $k32$, ..., and $k3d$, which are respectively connected to the neurons $z31$ to $z3d$, and respectively correspond to hyper-parameters $p31$, $p32$, ..., and $p3d$. In other words, the degree(s) to which the neurons $z31$ to $z3d$ constrain/restrict/enhance/strengthen the feature(s) of the hidden layer HL3 may be determined/decided using the hyper-parameters $p31$ to $p3d$. Similar to the output value $Tz21$ of the neuron $z21$, the output value $Tz31$ of the neuron $z31$ may, for example, satisfy $Tz31$=g($W2131*Tz21+W2231*Tz22+$ ... $+W2c31*Tz2c+p31*Tk31$). In this case, the output value $Tk31$ of the neuron $k31$ may serve as a distance function.

In an embodiment, the output value Ty3 of the neuron y3 may be related to or correspond to the packet loss of the network performance key performance indicator(s). Packet loss occurs when data packet(s) travelling across a network fail to reach the destination. Inevitably, there may be data packet(s) accidentally lost in the network. In addition, as the number of data packets moving between in the network increases, the node(s) may not be able to process the data packets it/they face(s), causing some or all of the data packets to be rejected or discarded. In an embodiment, packet loss is mainly caused by the network layer, so the attention mechanism (s) may be introduced for the hidden layer HL3 as well. That is, a neuron (also referred to as a third neuron) (for instance, the neuron $z31$) in the hidden layer HL3 (which is the third layer) is directly connected to an output neuron (for instance, the neuron y3) and/or an auxiliary neuron (also referred to as a third auxiliary neuron) (for instance, the neuron $k31$).

In an embodiment, the output value Ty2 of the neuron y2 may be related to or correspond to the jitter of the network performance key performance indicator(s). Jitter may be caused by congestion generated by multiple network connections (namely, multiple data packet trying to use the same network) all active simultaneously. In an embodiment, jitter is mainly caused by the data link layer, so the attention mechanism(s) may be introduced for the hidden layer HL2. That is, a neuron (also referred to as a second neuron) (for instance, the neuron $z21$) in the hidden layer HL2 (which is the second layer) is directly connected to an output neuron (for instance, the neuron y2) and/or an auxiliary neuron (also referred to as a second auxiliary neuron) (for instance, the neuron $k21$).

As set forth above, the hidden layers HL1 to HL4 of the neural network 30 may be respectively extract different features, and may correspond to different layers of the open system interconnection model with the seven-layer structure. Therefore, when the neural network 30 is utilized to predict the network performance key performance indicator (s), the influence of the feature (s) of a certain neural network layer (for instance, the hidden layer HL2 or HL3) may be enhanced/strengthened by means of the attention mechanism(s) so as to improve the accuracy of inference.

Figure 4:
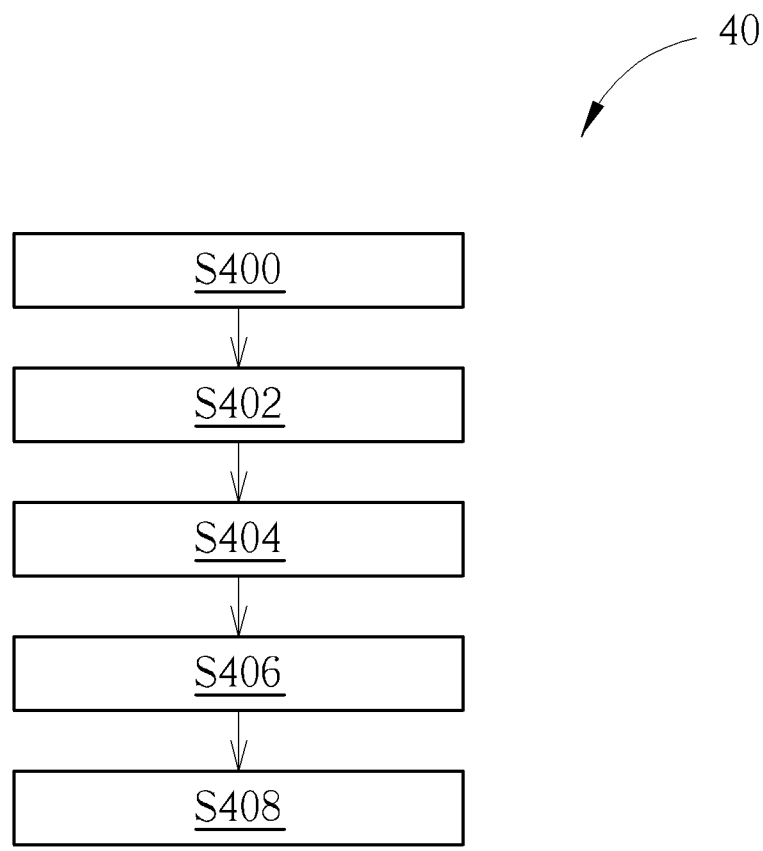
FIG. 4 and FIG. 5 are flowcharts of an optimization method 40 according to an embodiment of the present invention respectively.

FIG. 4 is a flowchart of an optimization method 40 according to an embodiment of the present invention. The optimization method 40 may be compiled into a code, executed by a processing circuit (for instance, a processing circuit 650 shown in FIG. 6) in the optimization method 40, and stored in the storage circuit (for instance, a storage circuit 670 shown in FIG. 6). The steps of the optimization method 40 shown in FIG. 4 are as follows:

Step S400: Start.
Step S402: Train a neural network.
Step S404: Adjust at least one of a plurality of auxiliary output values of a plurality of auxiliary neurons of the neural network.
Step S406: Perform inference using the neural network.
Step S408: End.

In the optimization method 40, the neural network may be the neural network 20 or 30. Alternatively, the neural network may include a plurality of neural network layers, for example, neural network layer(s) corresponding to the readout function $F_p$ (such as the input layer NL, the hidden layers HL1 to HL4, and/or the output layer TL), neural network layer (s) corresponding to the recurrent function $RNN_p$, and/or neural network layer(s) corresponding to the update function $U_p$, but is not limited thereto.

For example, Step S402 may correspond to the training of the neural network. In Step S402, multiple (known) first data is put through the (untrained) neural network. The output value of the (untrained) neural network is compared with a (known) target of the (known) first data. Then the parameters (for instance, the parameters $W1121$ to $W1b21$, $W2131$ to $W2c31$, $W31y2$ to $W3dy2$, and/or $W41y1$ to $W4ey1$) may be re-evaluated/update and optimized to train the neural network, thereby improving the performance of the task(s) the neural network is learning.

For example, using forward propagation, the output value(s) (for example, the output values Ty1 to Ty3) of the neural network may be calculated from the (received) first data according/corresponding to different parameters. There is a total error between the output value of the neural network and the (known) target. All the parameters may be updated recursively/repeatedly using, for example, back propagation, such that the output value of the neural network gradually approaches the target to minimize the total error. The parameters may thus be optimized to complete the training.

The first data may refer to data with a (known) target. For the neural network layer (s) (for instance, the neural network 20 or 30) corresponding to the readout function $F_p$, the first data may be, for example, the path hidden state vector $h_p$ when the feature metrics $y_p$ is known.

In Step S404, the auxiliary output value (s) (for instance, the output values Tk21 to Tk2c and/or Tk31 to Tk3d) of the auxiliary neuron(s) (for instance, the neurons k21 to k2c and/or k31 to k3d) of the (trained) neural network may be fine-tuned/adjusted. An auxiliary neuron may refer to a neuron directly connected to merely one neuron alone or directly connected to merely one neuron of one neural network layer alone. An auxiliary neuron may be utilized to introduce the attention mechanism (s) so as to constrain/restrict/enhance/strengthen the feature(s) of a certain neural network layer or a certain neuron.

Step S406 may correspond to the inference of the neural network, which applies/uses knowledge from the (trained) neural network to infer a result. In Step S402, when the (unknown) second data, which is to be interpreted/recognized, is input through the (trained) neural network, the (trained) neural network may perform inference on the second data according to the (optimized) parameters, to generate the output value (for instance, the feature metrics $y_p$ or the output values Ty1 to Ty3). That is, the (trained) neural network outputs a prediction based on predictive accuracy of the (trained) neural network.

The second data may refer to data to be interpreted/recognized. For the neural network layer(s) corresponding to the readout function $F_p$ (for instance, the neural network 20 or 30), the second data may be, for example, the path hidden state vector $h_p$ when the feature metrics $y_p$ is unknown.

Figure 5:
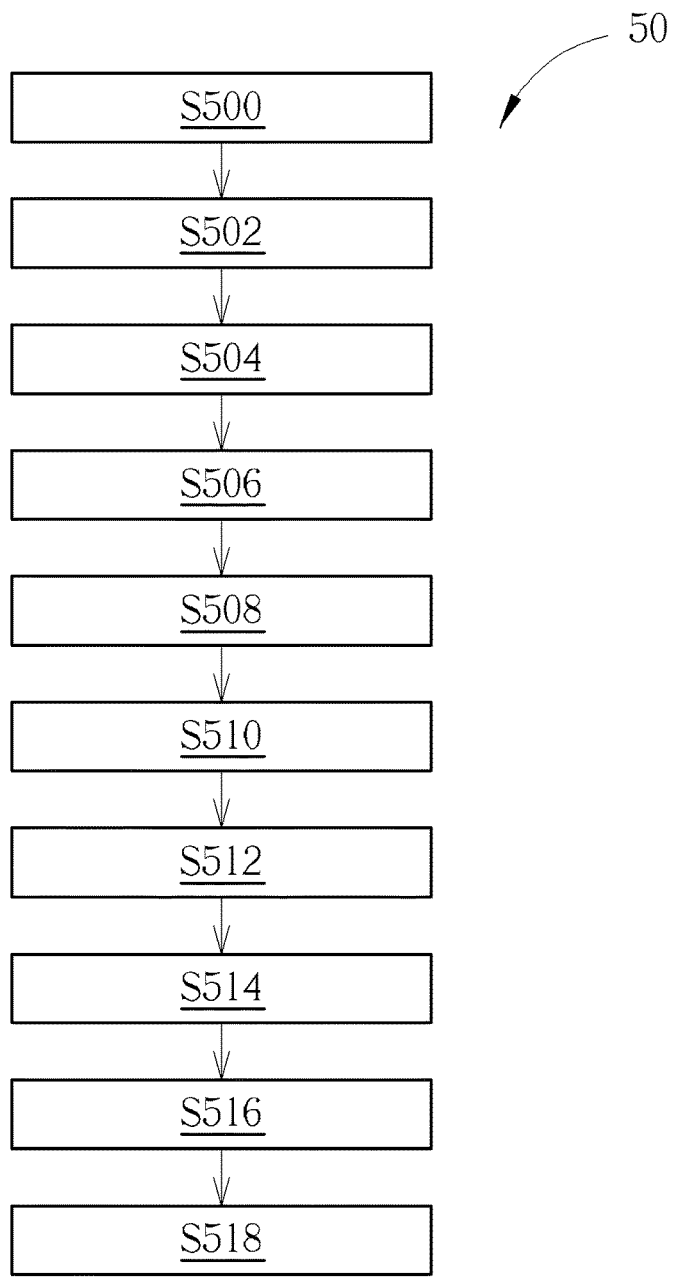

FIG. 5 is a flowchart of an optimization method 50 according to an embodiment of the present invention. The optimization method may replace the optimization method 40. The steps of the optimization method 50 shown in FIG. 5 are as follows:

Step S500: Start.

Step S502: Set up a plurality of auxiliary output values of a plurality of auxiliary neurons of at least one neural network.

Step S504: Set up at least one hyper-parameter of the at least one neural network.

Step S506: Train the at least one neural network.

Step S508: Perform an algorithm (sectionally or partially), wherein the at least one neural network corresponds to the algorithm.

Step S510: Determine the relation between an output value of the at least one neural network and network performance key performance indicator(s).

Step S512: Adjust at least one of the plurality of auxiliary output values of the plurality of auxiliary neurons of the neural network according to a type of the output value.

Step S514: Adjust the at least one hyper-parameter of the at least one neural network according to the type of the output value.

Step S516: Complete execution of the algorithm, wherein the execution of the algorithm involves performing inference withe the neural network.

Step S518: End.

In Step S502, the auxiliary output value(s) (for instance, the output values Tk21 to Tk2c and/or Tk31 to Tk3d) of the auxiliary neuron(s) (for instance, the neurons k21 to k2c and/or k31 to k3d) of the neural network(s) (for instance, the neural network 20 or 30) may be set manually in an embodiment of the present invention. For example, the auxiliary output value(s) is/are set to zero. Therefore, the auxiliary neuron(s) will not affect the training of the neural network(s) in Step S506.

In Step S504, the hyper-parameter(s) (for instance, the hyper-parameters p21 to p2c, p31 to p3d, p21y2 to p2cy2, and/or p31y1 to p3dy1) of the neural network(s) (for instance, the neural network 20 or 30) may be set manually in an embodiment of the present invention. Therefore, the training of the neural network(s) in Step S506 will not affect the hyper-parameter(s) of the neural network(s). In other words, the hyper-parameter(s) are untrained or untrainable.

In Step S508, merely part of (or a section of) the algorithm (for instance, line 1 to line 14 in the algorithm shown in Table 1) is executed/run in an embodiment of the present invention. In an embodiment, the at least one neural network may (respectively) be, for example, neural network(s) (for instance, the neural network 20 or 30) corresponding to the readout function $F_p$ of the algorithm, neural network(s) corresponding to the recurrent function $RNN_t$ of the algorithm, and/or neural network(s) corresponding to the update function $U_t$ of the algorithm, but is not limited thereto.

In Step S510, the present invention determines/decides whether the output value(s) (for instance, the output values Ty1 to Ty3) of the neural network (s) is/are associated with the network performance key performance indicator(s) (for instance, delay, jitter, or packet loss).

In an embodiment, when the output value(s) of the neural network(s) is/are related to delay or packet loss, the auxiliary output value(s) (for instance, the output values Tk21 to Tk2c) of a part of the auxiliary neuron(s) (for instance, the neurons k21 to k2c) of the neural network(s) (for instance, the neural network 30) may be maintained in step S512. For example, the auxiliary output value(s) is remained at zero in step S512. Then, the auxiliary output value(s) (for instance, the output values Tk31 to Tk3d) of another part of the auxiliary neuron(s) (for instance, the neurons k31 to k3d) of the neural network(s) (for instance, the neural network 30) may be adjusted/changed in step S512, such that the hidden layer HL3 or certain neuron(s) (for example, the neuron k31) of the hidden layer HL3 has/have an effect on the neuron(s) (for example, the neurons y1 and/or y3) of the output layer TL.

In an embodiment, when the output value(s) of the neural network(s) is/are related to jitter, the auxiliary output value(s) (for instance, the output values Tk31 to Tk3d) of a part of the auxiliary neuron(s) (for instance, the neurons k31 to k3d) of the neural network(s) (for instance, the neural network 30) may be maintained in step S512. For example, the auxiliary output value(s) is still set to zero in step S512. Then, the auxiliary output value (s) (for instance, the output values Tk21 to Tk2c) of another part of the auxiliary neuron(s) (for instance, the neurons k21 to k2c) of the neural network(s) (for instance, the neural network 30) may be adjusted/changed in step S512, such that the hidden layer HL2 or certain neuron(s) (for example, the neuron k21) of the hidden layer HL2 has/have an effect on the neuron(s) (for example, the neurons y2) of the output layer TL.

As set forth above, Step S512 determines whether to and how to adjust/change the auxiliary output value(s) (for instance, the output values Tk21 to Tk2c or Tk31 to Tk3d) of the auxiliary neuron(s) (for instance, the neurons k21 to k2c or k31 to k3d) of the neural network(s) according to how or whether the output value(s) (for instance, the output values Ty1 to Ty3) of the neural network(s) (for instance, the neural network 30) is related to network performance key performance indicator(s).

In Step S516, the execution of the algorithm is completed. For example, line 15 in the algorithm shown in Table 1 is run/performed.

The aforementioned are exemplary embodiments of the present invention, and those skilled in the art may readily make alterations and modifications. For example, in an embodiment, the order of Steps S502 and S504 may be interchangeable, and the order of Steps S512 and S514 may be interchangeable. In an embodiment, Step S514 may be optional/omitted. In an embodiment, Step S508 may be performed during Step S516.

Figure 6:
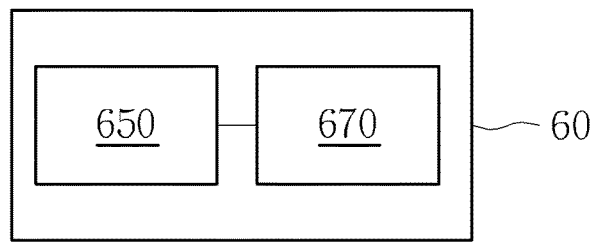
FIG. 6 is a schematic diagram of an optimizer according to an embodiment of the present invention.

FIG. 6 is a schematic diagram of an optimizer 60 according to an embodiment of the present invention. The optimizer 60 may replace the optimizer 160. The optimizer 60 may include the processing circuit 650 and the storage circuit 670. The processing circuit 650 may be a central processing unit (CPU), a microprocessor, or an application-specific integrated circuit (ASIC), but is not limited thereto. The storage circuit 670 may be a subscriber identity module (SIM), a read-only memory (ROM), a flash memory, a random access memory (RAM), disc read-only memory (CD-ROM/DVD-ROM/BD-ROM), a magnetic tape, a hard disk, an optical data storage device, a non-volatile storage device, a non-transitory computer-readable medium, but is not limited thereto.

In summary, the present invention predicts network performance key performance indicator (s) using neural network (s) and attentional mechanism(s) to achieve routing optimization, network planning, and rapid failure recovery.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical network optimization method, comprising:
   training a neural network;
   adjusting at least one first auxiliary output value of a plurality of auxiliary output values of a plurality of auxiliary neurons of the neural network from zero to at least one non-zero value respectively according to a relation between an output value of an output neuron in an output layer of the neural network and one of a plurality of layers of an open system interconnection model, wherein the step of adjusting the at least one first auxiliary output value comprises:
      determining whether to adjust the plurality of auxiliary output values of the plurality of auxiliary neurons of the neural network according to a relation between the output value and a network performance key performance indicator; and
   performing inference with the neural network,
   wherein the plurality of auxiliary neurons includes at least one first auxiliary neuron, and the at least one first auxiliary neuron having the at least one first auxiliary output value respectively is in one of a plurality of hidden layers, which is corresponding to the layer of the open system interconnection model.

2. The optical network optimization method of claim 1, further comprising:
   setting the plurality of auxiliary output values of the plurality of auxiliary neurons of the neural network to zero before training the neural network.

3. The optical network optimization method of claim 1, wherein any of the plurality of auxiliary neurons is directly connected only one of a plurality of neurons of the neural network.

4. The optical network optimization method of claim 1, wherein a first neuron directly connected one of the at least one first auxiliary neuron of the plurality of auxiliary neurons of the neural network is directly connected the output neuron of the neural network, there is a hyper-parameter between the first auxiliary neuron and the first neuron, and there is another hyper-parameter between the first neuron and the output neuron.

5. The optical network optimization method of claim 1, further comprising:
   setting at least one hyper-parameter of the neural network without training.

6. The optical network optimization method of claim 1, wherein the plurality of hidden layers of the neural network correspond to the plurality of layers of the open system interconnection model with the seven-layer structure respectively.

7. The optical network optimization method of claim 1, wherein a plurality of second neurons of the plurality of hidden layers located in a second layer of the neural network is directly connected to the output neuron or a second auxiliary neuron when the output value of the output neuron of the output layer of the neural network is related to jitter, or wherein a plurality of third neurons of the plurality of hidden layers located in a third layer of the neural network is directly connected to the output neuron or a third auxiliary neuron when the output value of the output neuron is related to delay or packet loss.

8. The optical network optimization method of claim 1, wherein at least one input value of at least one input neuron of the neural network is related to optical power.

9. An optical network optimizer, comprising:
   a storage circuit, configured to store instructions of:
      training a neural network;
      adjusting at least one first auxiliary output value of a plurality of auxiliary output values of a plurality of auxiliary neurons of the neural network from zero to at least one non-zero value respectively according to a relation between an output value of an output neuron in an output layer of the neural network and one of a plurality of layers of an open system interconnection model, wherein the step of adjusting the at least one first auxiliary output value comprises:
         determining whether to adjust the plurality of auxiliary output values of the plurality of auxiliary neurons of the neural network according to a relation between the output value and a network performance key performance indicator; and
      performing inference with the neural network; and
   a processing circuit, coupled to the storage device, configured to execute the instructions stored in the storage circuit,
   wherein the plurality of auxiliary neurons includes at least one first auxiliary neuron, and the at least one first auxiliary neuron having the at least one first auxiliary output value respectively is in one of a plurality of hidden layers, which is corresponding to the layer of the open system interconnection model.

10. The optical network optimizer of claim 9, wherein the plurality of hidden layers of the neural network correspond to the plurality of layers of the open system interconnection model with the seven-layer structure respectively.

11. The optical network optimizer of claim 9, wherein a plurality of second neurons of the plurality of hidden layers located in a second layer of the neural network is directly connected to the output neuron or a second auxiliary neuron when the output value of the output neuron of the output layer of the neural network is related to jitter, or wherein a plurality of third neurons of the plurality of hidden layers located in a third layer of the neural network is directly connected to the output neuron or a third auxiliary neuron when the output value of the output neuron is related to delay or packet loss.

12. The optical network optimizer of claim 9, wherein at least one input value of at least one input neuron of the neural network is related to optical power.

13. The optical network optimization method of claim 1, wherein the network performance key performance indicator is delay, jitter, or packet loss.

* * * * *